(12) United States Patent
Hwang et al.

(10) Patent No.: US 8,861,109 B1
(45) Date of Patent: Oct. 14, 2014

(54) DATA PROCESSING SYSTEM WITH ADJACENT TRACK INTERFERENCE METRIC

(71) Applicant: LSI Corporation, San Jose, CA (US)

(72) Inventors: Eui Seok Hwang, Milpitas, CA (US); Richard Rauschmayer, Longmont, CO (US); Shaohua Yang, San Jose, CA (US); Bruce Wilson, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/963,589

(22) Filed: Aug. 9, 2013

(51) Int. Cl.
*G11B 27/36* (2006.01)

(52) U.S. Cl.
USPC .......................................................... 360/31

(58) Field of Classification Search
USPC ............... 360/53, 77.01, 77.06, 77.08, 77.11, 360/77.12, 31, 39, 55
See application file for complete search history.

(56) References Cited

U.S. PATENT DOCUMENTS

| | | | |
|---|---|---|---|
| 6,947,234 B2 * | 9/2005 | Lamberts et al. ............... | 360/53 |
| 8,250,434 B2 | 8/2012 | Yang et al. | |
| 2012/0063022 A1 | 3/2012 | Mathew | |
| 2012/0063024 A1 | 3/2012 | Mathew | |
| 2012/0063284 A1 | 3/2012 | Mathew | |

OTHER PUBLICATIONS

Cassuto et al, "Indirection Systems for Shingled-Recording Disk Drives" 26th IEEE Conference on Mass Storage Systems and Technologies (May 2010).
Gibson et al "Directions for Shingled-Write and Two-Dimensional Magnetic Recording System Architectures: Synergies with Solid-State Disks" Carnegie Mellon Univ. May 1, 2009.
U.S. Appl. No. 13/741,003, Unpublished filed Jan. 14, 2013, Lu Lu.
U.S. Appl. No. 13/886,170, Unpublished filed May 2, 2013, Lu Lu.
U.S. Appl. No. 13/777,915, Unpublished filed Feb. 26, 2013, Jun Xiao.
Wu, et al., "Equation Based LDPC Decoder for Intersymbol Interference Channels" 2005 IEEE International Conf. on Acoustics, Speech, and Signal Processing vol. 5 Mar. 2005.

* cited by examiner

*Primary Examiner* — Nabil Hindi
(74) *Attorney, Agent, or Firm* — Hamilton DeSanctis & Cha (57) ABSTRACT

A data processing circuit includes a long magnet identification circuit operable to identify long magnet bits in data to be processed, the long magnet bits comprising bits having a same value as a number of preceding and subsequent bits, an error calculation circuit operable to subtract an ideal version of the long magnet bits from the long magnet bits to yield an error signal, an adjacent track interference metric calculation circuit operable to calculate an adjacent track interference metric based on the error signal, and a comparator circuit operable to compare the adjacent track interference metric with a threshold value and to assert a refresh signal when the adjacent track interference metric is greater than the threshold value.

20 Claims, 8 Drawing Sheets

DATA PROCESSING SYSTEM WITH ADJACENT TRACK INTERFERENCE METRIC

FIELD OF THE INVENTION

Various embodiments of the present invention provide systems and methods for preventing adjacent track erasure, and more particularly to systems and methods for generating an adjacent track interference metric for monitoring degradation in a read signal.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. When an adjacent track is written too many times before a track is refreshed or rewritten, the data recorded on the track can be distorted by the adjacent track write operations.

SUMMARY

Various embodiments of the present invention provide systems and methods for preventing adjacent track erasure, and more particularly to systems and methods for generating an adjacent track interference metric for monitoring degradation in a read signal.

A data processing circuit is disclosed including a long magnet identification circuit operable to identify long magnet bits in data to be processed, the long magnet bits comprising bits having a same value as a number of preceding and subsequent bits, an error calculation circuit operable to subtract an ideal version of the long magnet bits from the long magnet bits to yield an error signal, an adjacent track interference metric calculation circuit operable to calculate an adjacent track interference metric based on the error signal, and a comparator circuit operable to compare the adjacent track interference metric with a threshold value and to assert a refresh signal when the adjacent track interference metric is greater than the threshold value.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Various embodiments of the present invention provide data processing systems with adjacent track interference metric, enabling data sectors to be refreshed before they are distorted by adjacent track write operations. The adjacent track interference metric indicates when a data sector is beginning to degrade or to become distorted. When the adjacent track interference metric reaches a threshold value for a sector, the sector can be refreshed or rewritten. (Notably, although in some embodiments data is read and processed in sectors, the use of an adjacent track interference metric is not limited to use with the reading of data in sector-long blocks, and may be used when reading data blocks of any length.)

The adjacent track interference metric, also referred to herein as the long magnet error sigma, is calculated based on errors in long magnets. The term "long magnet" is used herein to denote a bit within a run of same-valued bits, that is, a bit that has the same value as a number of preceding and subsequent bits. In some embodiments, a long magnet is defined as a bit with at least two preceding and subsequent bits having the same value, e.g., the center bits in the bit sequences "00000" or "11111". In other embodiments, other constant value run lengths are used to define a long magnet. The adjacent track interference metric is based on errors detected in long magnets because long magnets are impacted relatively severely by repeated side track writes. The adjacent track interference metric or long magnet error sigma estimates the adjacent track interference degradation based on the standard deviation of the error signal of such long magnet bits.

The threshold value for the adjacent track interference metric is adapted in various embodiments is calibrated using write and read tests and/or noise scaling using any of a number of techniques.

Data sectors are refreshed in any suitable manner, such as by reading and re-writing the data to the same location or by reading the data, writing the data to a different location, and marking the original location as empty.

Figure 1:
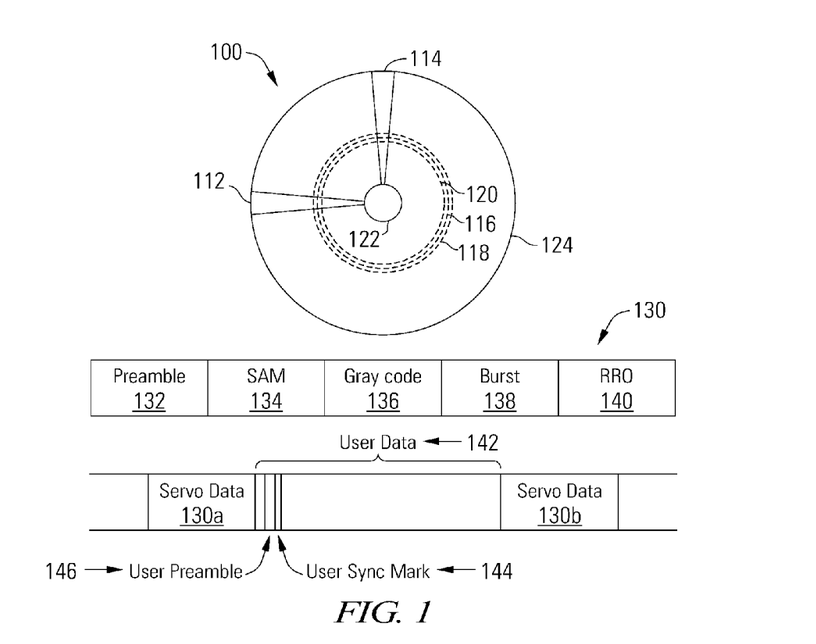
FIG. 1 is a diagram of a magnetic storage medium and sector data scheme that may be used with a data processing system with adjacent track interference metric in accordance with some embodiments of the present invention.

Turning to FIG. 1, a magnetic storage medium 100 with servo wedges (e.g., 112, 114) containing servo data is depicted in accordance with one or more embodiments of the present invention. An example data track 116 and its two adjacent data tracks 118, 120 are shown, indicated as dashed lines. The tracks 116, 118, 120 are segregated by servo data written within wedges 112, 114. It should be noted that while two tracks 116, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, followed by a Gray code 136, a burst field 138, and a repeatable run-out (RRO) field 140. It should be noted that a servo data set may have two or more fields of burst information. Further, it should be noted that different information may be included in the servo fields. Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin.

The data processing systems with adjacent track interference metric are operable in some embodiments to detect distortion in user data 142 and to refresh distorted user data 142.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146. In various embodiments, the measurement of the adjacent track interference metric is performed during normal operation, or periodically, or during idle periods, or upon request, or at startup, etc. In embodiments in which the measurement of the adjacent track interference metric is performed during normal operation, long magnets are identified as a data sector is read, errors in the long magnets are identified, the adjacent track interference metric is calculated based on the long magnet errors, and if the metric is greater than a threshold, a refresh of the sector is requested.

Figure 2:
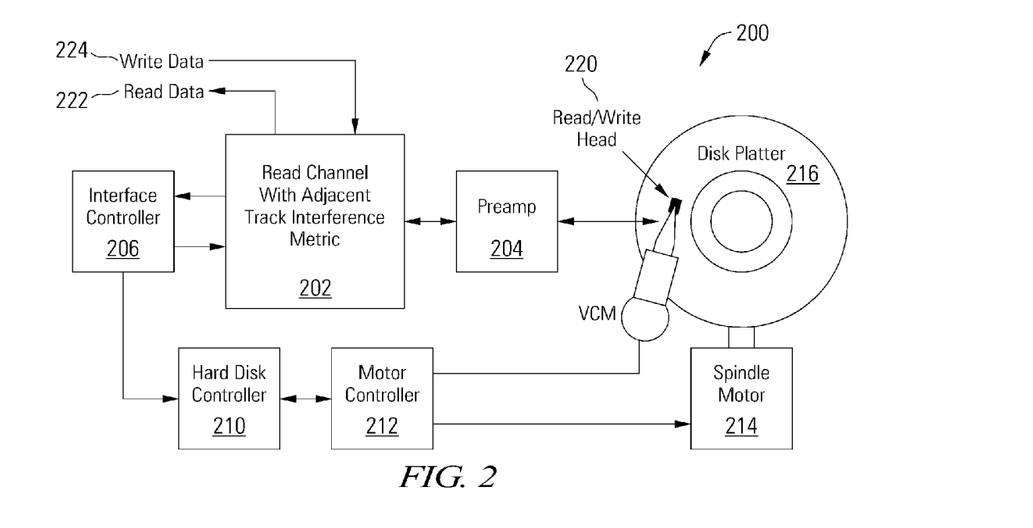
FIG. 2 depicts a storage system including a read channel with a data processing system with adjacent track interference metric in accordance with some embodiments of the present invention.

Turning to FIG. 2, a storage system 200 is disclosed which includes a read channel circuit 202 which calculates an adjacent track interference metric in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 decodes and digitizes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. During normal read operations or at other times in some embodiments, read channel circuit 202 calculates an adjacent track interference metric as disclosed herein, initiating a refresh of a data sector when the metric exceeds a threshold. Such a system with adjacent track interference metric may be implemented consistent with that disclosed in relation to FIGS. 3-5. In some cases, methods of detecting adjacent track interference and calculating an adjacent track interference metric may be performed consistent with the flow diagrams disclosed in relation to FIGS. 7-9.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 200 may be modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
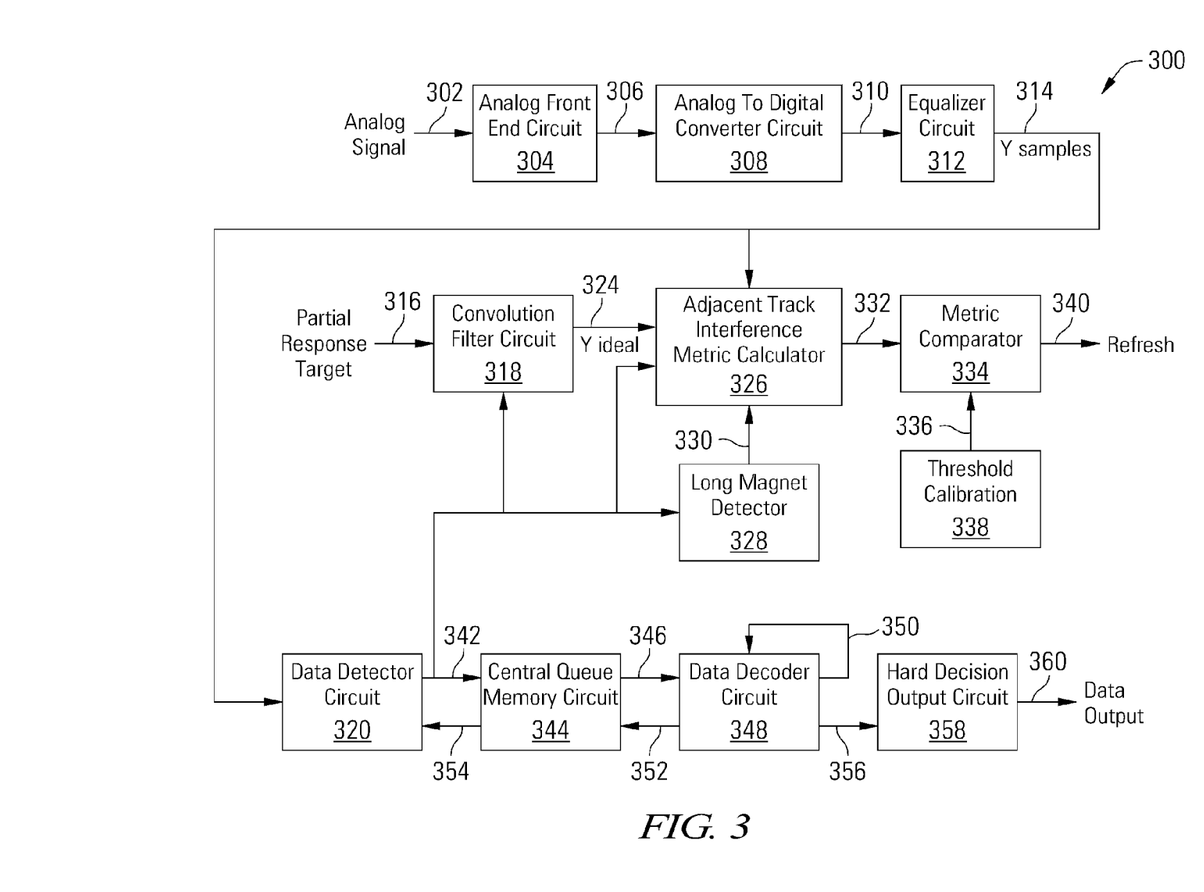
FIG. 3 is a block diagram of a data processing system with adjacent track interference metric calculated based on data detector output in accordance with some embodiments of the present invention.

FIG. 3 depicts a data processing circuit 300 including an adjacent track interference metric calculator 334 in accordance with some embodiments of the present invention. Data processing circuit 300 includes an analog front end circuit 304 that receives an analog signal 302. Analog front end circuit 304 processes analog signal 302 and provides a processed analog signal 306 to an analog to digital converter circuit 308. Analog front end circuit 304 may include, but is not limited to, an analog filter and an amplifier circuit as are known in the art. Based upon the disclosure provided herein, one of ordinary skill in the art will recognize a variety of circuitry that may be included as part of analog front end circuit 304. In some cases, analog input signal 302 is derived from a read/write head assembly (not shown) that is disposed in relation to a storage medium (not shown). Based upon the disclosure provided herein, one of ordinary skill in the art will recognize a variety of sources from which analog signal 302 may be derived.

Analog to digital converter circuit 308 converts processed analog signal 306 into a corresponding series of digital samples 310 or X samples. Analog to digital converter circuit 308 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

An equalizer circuit 312 receives digital samples 310 and applies an equalization algorithm to digital samples 310 to yield an equalized output 314, or Y samples. In some embodiments of the present invention, equalizer circuit 312 is a digital finite impulse response filter circuit as are known in the art. In some cases, equalizer circuit 312 includes sufficient memory to maintain one or more codewords until a data detector circuit 320 is available for processing, and for multiple passes through data detector circuit 320.

Data detector circuit 320 is a circuit capable of producing a detected output 342 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. In some embodiments, data detector circuit 320 provides both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 342 is provided to a central queue memory circuit 344 that operates to buffer data passed between data detector circuit 320 and data decoder circuit 348. When data decoder circuit 348 is available, data decoder circuit 348 receives detected output 342 from central queue memory 344 as a decoder input 346. Data decoder circuit 320 applies a data decoding algorithm to decoder input 346 in an attempt to recover originally written data. The result of the data decoding algorithm is provided as a decoded output 352. Similar to detected output 342, decoded output 352 includes both hard decisions and soft decisions in some embodiments. Data decoder circuit 348 may be any data decoder circuit known in the art that is capable of applying a decoding algorithm to a received input. Data decoder circuit 348 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 348 provides the result of the data decoding algorithm as a decoded output 356. Decoded output 356 is provided to a hard decision output circuit 358 where the data is reordered before providing a series of ordered data sets as a data output 360.

One or more iterations through the combination of data detector circuit 320 and data decoder circuit 348 may be made in an effort to converge on the originally written data set. Processing through both the data detector circuit 320 and the data decoder circuit 348 is referred to as a "global iteration". For the first global iteration, data detector circuit 320 applies the data detection algorithm without guidance from a decoded output. For subsequent global iterations, data detector circuit 320 applies the data detection algorithm to buffered equalized output 314 as guided by decoded output 352. Decoded output 352 is received from central queue memory 344 as a detector input 354.

During each global iteration it is possible for data decoder circuit 348 to make one or more local iterations including application of the data decoding algorithm to decoder input 346. For the first local iteration, data decoder circuit 348 applies the data decoder algorithm without guidance from a decoded output 350. For subsequent local iterations, data decoder circuit 348 applies the data decoding algorithm to decoder input 346 as guided by a previous decoded output 350.

As part of a read operation, the adjacent track interference metric calculator 326 calculates an adjacent track interference metric 332 to determine whether the current sector has been degraded by write operations to adjacent tracks. Sectors are degraded when their side tracks are written many times. The adjacent track interference metric estimates the degradation from the readback signal, based on a comparison of the equalized output 314 and the true values of the equalized output 314 as represented by Y ideal values 324, detected values 342, or decoded values 456 (see FIG. 4), using either or both soft decisions and hard decisions. The resulting adjacent track interference metric 332 can be used for making decisions to rewrite the degraded sectors.

In some embodiments in which the true values of the equalized output 314 as represented by Y ideal values 324 are used to calculate the adjacent track interference metric 332, a convolution filter circuit 318 convolves the detected output 342 with the partial response target 316 of the data channel to yield the Y ideal values 324. Convolution filter circuit 318 may be any circuit known in the art that is capable of applying target based filtering to an input signal to yield an output conformed to a target. Based upon the disclosure provided herein, one of ordinary skill in the art will recognize a variety of circuitry that may be included as part of convolution filter circuit 318 to generate Y ideal values 324. In some embodiments in which the true values of the equalized output 314 are represented by Y ideal values 324, the adjacent track interference metric calculator 326 calculates the difference between the equalized output 314 and the Y ideal values 324 on a bit by bit basis, yielding an error signal $Y_{err}[i]$, where index i is the bit index in the stream for a data sector. The error signal $Y_{err}[i]$ of a Y sample bit in equalized output 314 having index i is computed in some embodiments as follows:

$$Y_{err}[i]=Y[i]-Y_{ideal}[i] \tag{Eq 1}$$

where $Y[i]$ is the equalized Y sample bit at index i, and $Y_{ideal}[i]$ is the ideal or true value for the corresponding bit. Again, the $Y_{ideal}[i]$ value can be determined in any of a number of manners in various embodiments. In some embodiments, $Y_{ideal}[i]$ is calculated by convolving a detected value or hard decision, obtained from a data detector such as, but not limited to, a Viterbi detector, with a partial response target for the data channel, yielding Y ideal values 324. In some embodiments, $Y_{ideal}[i]$ is a detected value or hard decision in detected output 342, obtained from a data detector such as, but not limited to, a Viterbi detector. In some embodiments, $Y_{ideal}[i]$ is based on a soft decision in detected output 342, obtained from a data detector such as, but not limited to, a Viterbi detector. In some embodiments, $Y_{ideal}[i]$ is calculated by convolving a hard decision, obtained from a data decoder such as, but not limited to, a low density parity check decoder, with a partial response target for the data channel. In some embodiments, $Y_{ideal}[i]$ is a hard decision in decoded output 456, obtained from a data decoder such as, but not limited to, a low density parity check decoder. In some embodiments, $Y_{ideal}[i]$ is determined based on a soft decision in decoded output 456, a likelihood measure or probability for possible values of a bit, obtained from a data detector such as, but not limited to, a Viterbi detector, or from a data decoder such as, but not limited to, a low density parity check decoder.

The adjacent track interference metric 332, also referred to herein as long magnet error sigma $Z_L$, is calculated in some embodiments as the standard deviation of the error signal $Y_{err}[i]$, considering only long magnet bits. In some embodiments, the adjacent track interference metric calculator 326 calculates error signal $Y_{err}[i]$ only for long magnets, based on a long magnet detected signal 330 generated by long magnet detector 328. In some other embodiments, the adjacent track interference metric calculator 326 calculates error signal $Y_{err}[i]$ for all bits, then calculates adjacent track interference metric 332 for only long magnets. The long magnet detector 328 compares the current bit with the previous and subsequent bits to determine if they have the same value. For example, if the current bit is a 0, and the two previous bits and the two subsequent bits are also 0, the long magnet detector 328 asserts the long magnet detected signal 330. The long magnet detector 328 may operate on any bit input to the adjacent track interference metric calculator 326 to determine whether the current bit being processed by the adjacent track interference metric calculator 326 is a long magnet, such as, but not limited to, the detected output 342 as shown in FIG. 3, or the equalized output 314. The long magnet detector 328 may be any circuit for identifying a long magnet. Based upon the disclosure provided herein, one of ordinary skill in the art will recognize a variety of circuitry that may be included as part of long magnet detector 328.

The adjacent track interference metric 332 or long magnet error sigma $Z_L$ is computed in some embodiments in adjacent track interference metric calculator 326 as the standard deviation of the error signal by the mean and mean square of the error signal as follows:

$$Z_L=(E_{i\in\psi}[Y_{err}[i]^2]-E_{i\in\psi}^2[Y_{err}[i]])^{1/2} \tag{Eq 2}$$

where $Y_{err}[i]$ is the error signal corresponding to a non-return to zero value a[i] of bit i. E[ . . . ] denotes the mean operation, and $\psi$ is the long magnet bit location identified by long magnet detector 328:

$$\psi=\{\forall i \text{ such that } a[i-2]=a[i-1]=a[i]=a[i+1]=a[i+2]\} \tag{Eq 3}$$

The mean of the error signal $Y_{err}[i]$ is calculated by averaging the values of the stream of long magnet error values. The error signal $Y_{err}[i]$ is a gray level distance from the ideal value, thus, given a $Y[i]$ with a range of −32 to 31 and a $Y_{ideal}[i]$ equal to 22 or −22 for long magnet bits with a partial response target of [8 14], $Y_{err}[i]$ would range from −54 to 53.

In some embodiments, the adjacent track interference metric 332 or long magnet error sigma $Z_L$ is calculated in adjacent track interference metric calculator 326 as set forth in the following pseudo-code:

```
sum_long_magn=0;  sumsq_long_magn=0;  no_long_
   magn=0;
run_length=0;
nrz_p=a[0];
for (i=1; i<len_nrz; i++) {
   if (a[i]==nrz_p) {
      run_length++;
      if (run_length≥5) {
         sum_long_magn+=Y_err[i-2];
         sumsq_long_magn+=Y_err[i-2]*Y_err[i-2];
         no_long_magn++;
      }
   } else
      run_length=0;
   nrz_p=a[i];
}
errsig_long_magn=sqrt(sumsq_long_magn/no_long_
   magn-(sum_long_magn/no_long_magn)*(sum_long_
   magn/no_long_magn));
```

The adjacent track interference metric calculator 326 may be any circuit for calculating the adjacent track interference metric 332 as disclosed herein. Based upon the disclosure provided herein, one of ordinary skill in the art will recognize a variety of circuitry that may be included as part of adjacent track interference metric calculator 326.

A metric comparator 334 compares the adjacent track interference metric 332 with a threshold 336. If the adjacent track interference metric 332 exceeds threshold 336, the assumption is made that adjacent track interference has occurred, and the refresh signal 340 is asserted. When the refresh signal 340 is asserted, the sector is refreshed in any suitable manner by the storage device. In some embodiments, the storage device controller reads the sector and rewrites the sector in place. Notably, an adjacent track interference metric calculator 326 may be used in data processing systems other than that disclosed in FIG. 3.

The threshold 336 is generated by a threshold calibration circuit 338, which calibrates the threshold 336 at a point where the adjacent track interference metric 332 indicates that the sector has been degraded by adjacent track writes, but before the sector has been degraded to the point where it cannot be successfully refreshed. In some embodiments that use a data decoder circuit 348 in a read operation to obtain the correct values of the data, a sector can be refreshed by rewriting the sector with data derived from the data decoder circuit 348. In such embodiments, the data processing circuit 300 can be caused to process increasingly degraded data until the data decoder circuit 348 can no longer converge on the correct values. The threshold calibration circuit 338 determines the value of the adjacent track interference metric 332 for the degraded data that causes the data decoder circuit 348 to fail, and sets the threshold 336 at a lower level at which the data is somewhat degraded but will not cause the data decoder circuit 348 to fail. This enables data to be refreshed after degradation begins but before it cannot be correctly read and refreshed. The cushion between the threshold 336 and the value of the adjacent track interference metric 332 at the point where the data has degraded too much for recovery by data decoder circuit 348 can be adjusted as desired to balance the risk of data corruption and too frequent refreshes. The threshold calibration process can be performed during manufacturing or at any other suitable point. The threshold calibration circuit 338 may be any circuit for determining the level of the threshold 336. Based upon the disclosure provided herein, one of ordinary skill in the art will recognize a variety of circuitry that may be included as part of threshold calibration circuit 338. Several embodiments of the threshold calibration will be disclosed in more detail below with respect to FIGS. 6-9.

Figure 4:
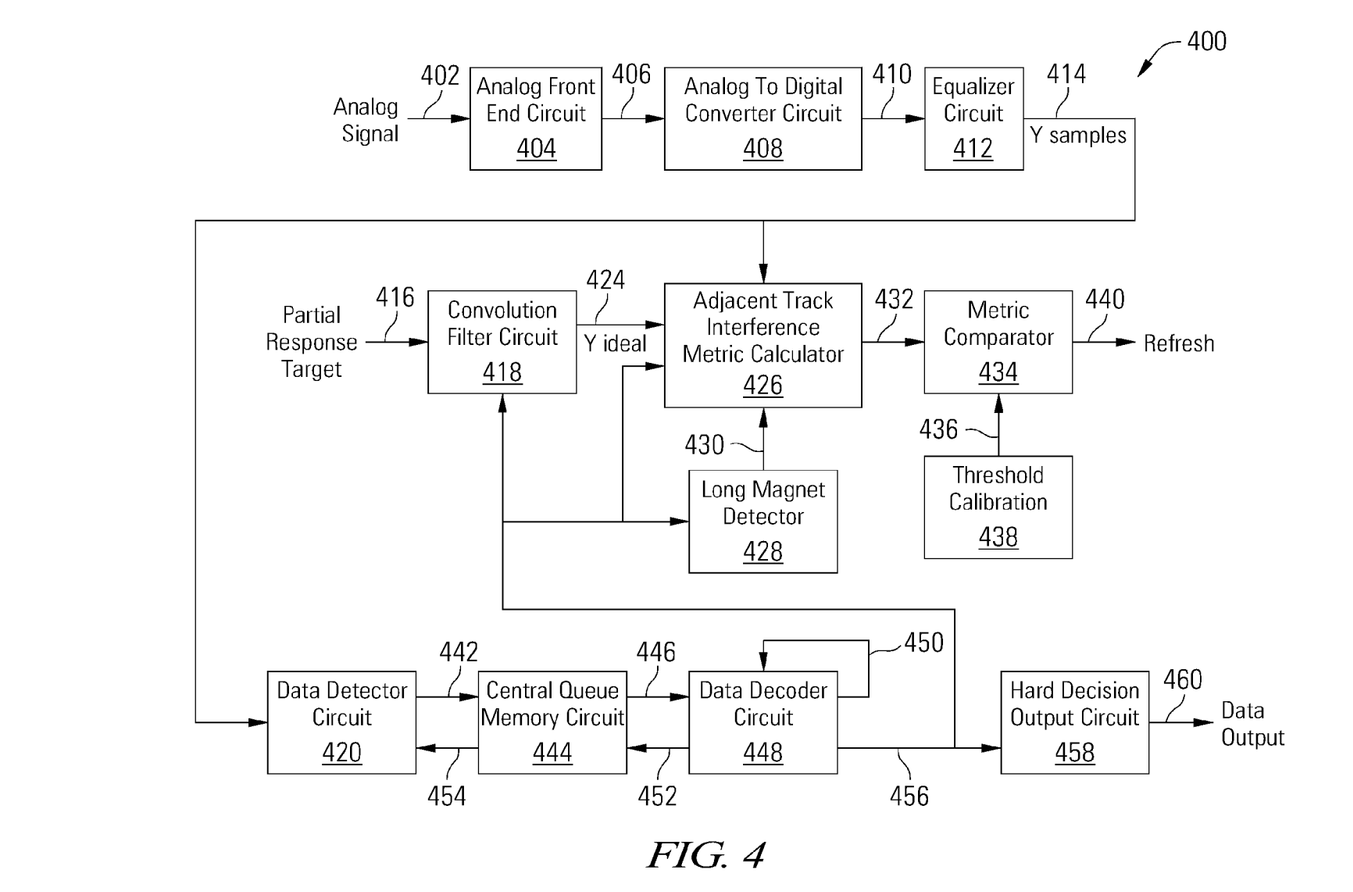
FIG. 4 is a block diagram of a data processing system with adjacent track interference metric calculated based on data decoder output in accordance with some embodiments of the present invention.

Turning now to FIG. 4, a data processing circuit 400 including an adjacent track interference metric calculator 434 is depicted in accordance with some embodiments of the present invention. In this embodiment, the adjacent track interference metric 432 is calculated using the decoded output 456 from data decoder circuit 448 to represent the true values of equalized output 414.

Data processing circuit 400 includes an analog front end circuit 404 that receives an analog signal 402. Analog front end circuit 404 processes analog signal 402 and provides a processed analog signal 406 to an analog to digital converter circuit 408. Analog front end circuit 404 may include, but is not limited to, an analog filter and an amplifier circuit as are known in the art. Based upon the disclosure provided herein, one of ordinary skill in the art will recognize a variety of circuitry that may be included as part of analog front end circuit 408. In some cases, analog input signal 402 is derived from a read/write head assembly (not shown) that is disposed in relation to a storage medium (not shown). Based upon the disclosure provided herein, one of ordinary skill in the art will recognize a variety of sources from which analog signal 402 may be derived.

Analog to digital converter circuit 408 converts processed analog signal 406 into a corresponding series of digital samples 410 or X samples. Analog to digital converter circuit 408 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

An equalizer circuit 412 receives digital samples 410 and applies an equalization algorithm to digital samples 410 to yield an equalized output 414, or Y samples. In some embodiments of the present invention, equalizer circuit 412 is a digital finite impulse response filter circuit as are known in the art. In some cases, equalizer circuit 412 includes sufficient memory to maintain one or more codewords until a data detector circuit 420 is available for processing, and for multiple passes through data detector circuit 420.

Data detector circuit 420 is a circuit capable of producing a detected output 442 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. In some embodiments, data detector circuit 420 provides both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 442 is provided to a central queue memory circuit 444 that operates to buffer data passed between data detector circuit 420 and data decoder circuit 448. When data decoder circuit 448 is available, data decoder circuit 448 receives detected output 442 from central queue memory 444 as a decoder input 446. Data decoder circuit 420 applies a data decoding algorithm to decoder input 446 in an attempt to recover originally written data. The result of the data decoding algorithm is provided as a decoded output 452. Similar to detected output 442, decoded output 452 includes both hard decisions and soft decisions in some embodiments. Data decoder circuit 448 may be any data decoder circuit known in the art that is capable of applying a decoding algorithm to a received input. Data decoder circuit 448 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 448 provides the result of the data decoding algorithm as a decoded output 456. Decoded output 456 is provided to a hard decision output circuit 458 where the data is reordered before providing a series of ordered data sets as a data output 460.

One or more iterations through the combination of data detector circuit 420 and data decoder circuit 448 may be made in an effort to converge on the originally written data set. For the first global iteration, data detector circuit 420 applies the data detection algorithm without guidance from a decoded output. For subsequent global iterations, data detector circuit 420 applies the data detection algorithm to buffered equalized output 414 as guided by decoded output 452. Decoded output 452 is received from central queue memory 444 as a detector input 454.

During each global iteration it is possible for data decoder circuit 448 to make one or more local iterations including application of the data decoding algorithm to decoder input 446. For the first local iteration, data decoder circuit 448 applies the data decoder algorithm without guidance from a decoded output 450. For subsequent local iterations, data decoder circuit 448 applies the data decoding algorithm to decoder input 446 as guided by a previous decoded output 450.

As part of a read operation, the adjacent track interference metric calculator 426 calculates an adjacent track interference metric 432 to determine whether the current sector has been degraded by write operations to adjacent tracks. Sectors are degraded when their side tracks are written many times. The adjacent track interference metric estimates the degradation from the readback signal, based on a comparison of the equalized output 414 and the true values of the equalized output 414 as represented by decoded values 456 in this embodiment, using either or both soft decisions and hard decisions. The resulting adjacent track interference metric 432 can be used for making decisions to rewrite the degraded sectors.

In some embodiments in which the true values of the equalized output 414 as represented by Y ideal values 424 are used to calculate the adjacent track interference metric 432, a convolution filter circuit 418 convolves the decoded output 456 with the partial response target 416 of the data channel to yield the Y ideal values 424. Convolution filter circuit 418 may be any circuit known in the art that is capable of applying target based filtering to an input signal to yield an output conformed to a target. Based upon the disclosure provided herein, one of ordinary skill in the art will recognize a variety of circuitry that may be included as part of convolution filter circuit 418 to generate Y ideal values 424. In some embodiments in which the true values of the equalized output 414 are represented by Y ideal values 424, the adjacent track interference metric calculator 426 calculates the difference between the equalized output 414 and the Y ideal values 424 on a bit by bit basis according to Equation 1, yielding an error signal $Y_{err}[i]$, where index i is the bit index in the stream for a data sector. In other embodiments in which the true values are based directly on the decoded output 456, the Y ideal value 424 input to the adjacent track interference metric calculator 426 can be omitted.

The adjacent track interference metric 432, also referred to herein as long magnet error sigma $Z_L$, is calculated in some embodiments as the standard deviation of the error signal $Y_{err}[i]$, considering only long magnet bits. In some embodiments, the adjacent track interference metric calculator 426 calculates error signal $Y_{err}[i]$ only for long magnets, based on a long magnet detected signal 430 generated by long magnet detector 428. In some other embodiments, the adjacent track interference metric calculator 426 calculates error signal $Y_{err}[i]$ for all bits, then calculates adjacent track interference metric 432 for only long magnets. The long magnet detector 428 compares the current bit with the previous and subsequent bits to determine if they have the same value. For example, if the current bit is a 0, and the two previous bits and the two subsequent bits are also 0, the long magnet detector 428 asserts the long magnet detected signal 430. The long magnet detector 428 may operate on any bit input to the adjacent track interference metric calculator 426 to determine whether the current bit being processed by the adjacent track interference metric calculator 426 is a long magnet, such as, but not limited to, the detected output 442 as shown in FIG. 4, or the equalized output 414. The long magnet detector 428 may be any circuit for identifying a long magnet. Based upon the disclosure provided herein, one of ordinary skill in the art will recognize a variety of circuitry that may be included as part of long magnet detector 428.

The adjacent track interference metric 432 or long magnet error sigma $Z_L$ is computed in some embodiments in adjacent track interference metric calculator 426 as the standard deviation of the error signal by the mean and mean square of the error signal according to Equation 2.

The adjacent track interference metric calculator 426 may be any circuit for calculating the adjacent track interference metric 432 as disclosed herein. Based upon the disclosure provided herein, one of ordinary skill in the art will recognize a variety of circuitry that may be included as part of adjacent track interference metric calculator 426.

A metric comparator 434 compares the adjacent track interference metric 432 with a threshold 436. If the adjacent track interference metric 432 exceeds threshold 436, the assumption is made that adjacent track interference has occurred, and the refresh signal 440 is asserted. When the refresh signal 440 is asserted, the sector is refreshed in any suitable manner by the storage device. In some embodiments, the storage device controller reads the sector and rewrites the sector in place. Notably, an adjacent track interference metric calculator 426 may be used in data processing systems other than that disclosed in FIG. 4.

The threshold 436 is generated by a threshold calibration circuit 438, which calibrates the threshold 436 at a point where the adjacent track interference metric 432 indicates that the sector has been degraded by adjacent track writes, but before the sector has been degraded to the point where it cannot be successfully refreshed. In some embodiments that use a data decoder circuit 448 in a read operation to obtain the correct values of the data, a sector can be refreshed by rewriting the sector with the data from the data decoder circuit 448. In such embodiments, the data processing circuit 400 can be caused to process increasingly degraded data until the data decoder circuit 448 can no longer converge on the correct values. The threshold calibration circuit 438 determines the value of the adjacent track interference metric 432 for the degraded data that causes the data decoder circuit 448 to fail, and sets the threshold 436 at a lower level at which the data is somewhat degraded but will not cause the data decoder circuit 448 to fail. This enables data to be refreshed after degradation begins but before it cannot be correctly read and refreshed. The cushion between the threshold 436 and the value of the adjacent track interference metric 432 at the point where the data has degraded too much for recovery by data decoder circuit 448 can be adjusted as desired to balance the risk of data corruption and too frequent refreshes. The threshold calibration process can be performed during manufacturing or at any other suitable point. The threshold calibration circuit 438 may be any circuit for determining the level of the threshold 436. Based upon the disclosure provided herein, one of ordinary skill in the art will recognize a variety of circuitry that may be included as part of threshold calibration circuit 438. Several embodiments of the threshold calibration will be disclosed in more detail below with respect to FIGS. 6-9.

Figure 5:
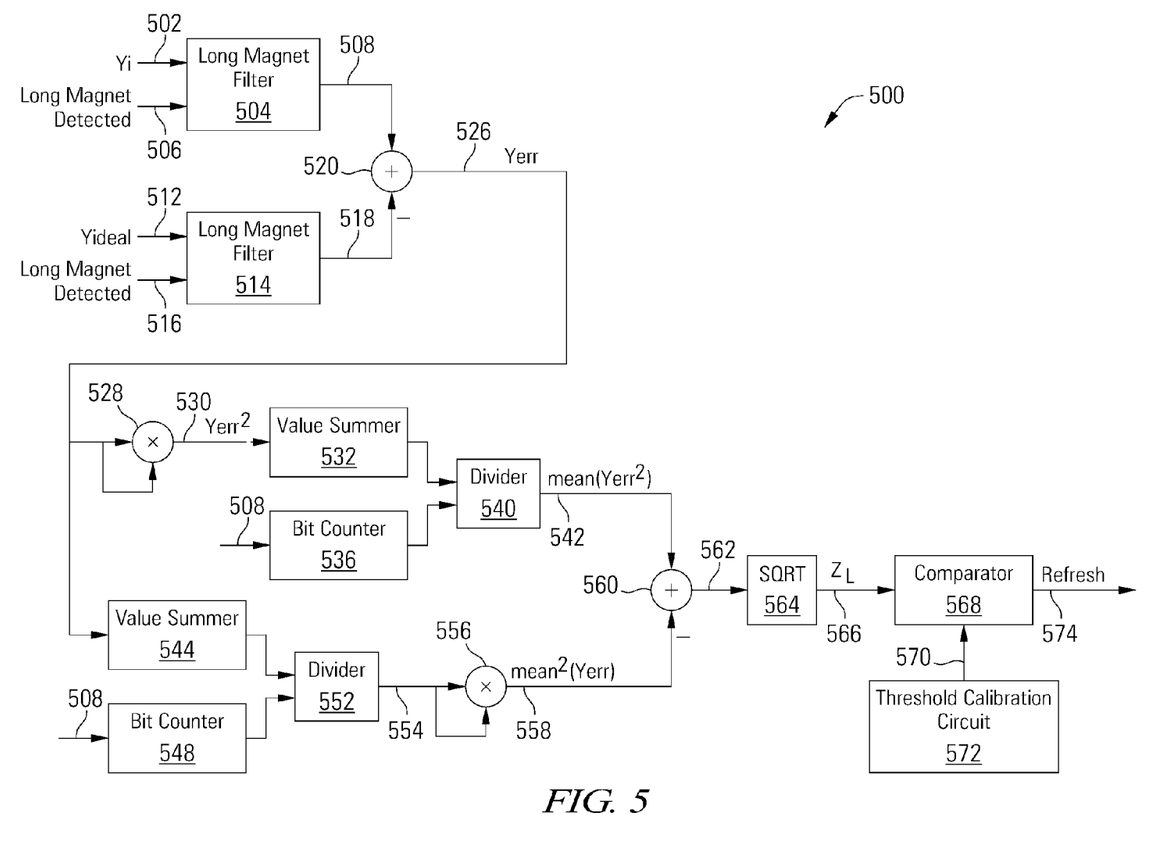
FIG. 5 is a block diagram of an adjacent track interference metric calculator in accordance with some embodiments of the present invention.

Turning to FIG. 5, an adjacent track interference metric calculator 500 suitable for use in place of adjacent track interference metric calculators 326 or 426 is disclosed in accordance with some embodiments of the present invention. The adjacent track interference metric calculator 500 calculates an adjacent track interference metric 566 $Z_L$ based on a comparison of Y samples at input 502 and Y ideal values at input 512. In this embodiment, the adjacent track interference metric calculator 500 first calculates an error signal 526 $Y_{err}$[i] according to Equation 1 for long magnets, and then calculates the adjacent track interference metric 566 as the standard deviation of error signal 526 according to Equation 2.

The Y samples at input 502 are filtered in a long magnet filter 504 based on a long magnet detected signal 506 to pass only long magnets 508. Similarly, the Y ideal values at input 512 are filtered in a long magnet filter 514 based on a long magnet detected signal 516, which in some embodiments is equivalent to long magnet detected signal 506, yielding long magnet ideal values 518. The ideal values 518 are subtracted from the sample values 508 in subtractor 520, yielding error signal 526.

The error signal 526 is squared in multiplier 528, yielding squared error signal 530. Value summer circuit 532 accumulates or totals the squared errors, bit counter 536 counts the number of long magnet bits, and divider 540 divides the total squared errors by the number of errors to yield the mean of the squared errors 542. Value summer circuit 544 accumulates or totals the errors, bit counter 548 counts the number of long magnet bits, and divider 552 divides the total errors by the number of errors to yield the mean of the errors 554, which is then squared in multiplier 556 to yield the squared mean of the errors 558. (In some embodiments, bit counters 536 and 548 are embodied in a single counter.) The squared mean of the errors 558 is subtracted from the mean of the squared errors 542 in subtractor 560, and square root circuit 564 calculates the square root of the difference 562 to yield the adjacent track interference metric 566 $Z_L$.

A comparator 568 compares the adjacent track interference metric 566 $Z_L$ with a threshold 570, set by threshold calibration circuit 572, asserting refresh signal 574 when adjacent track interference metric 566 exceeds threshold 570.

Figure 6:
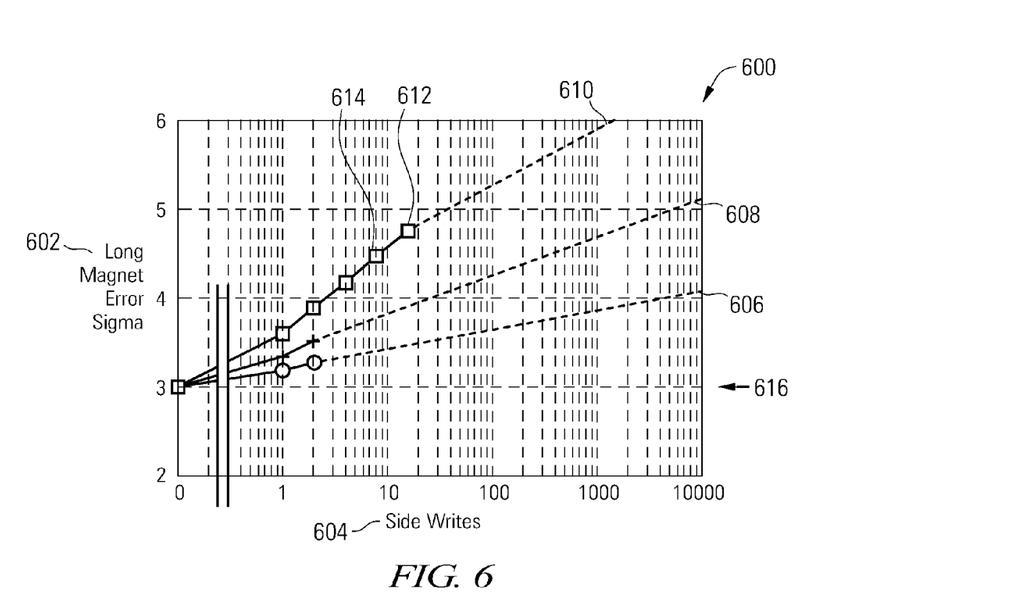
FIG. 6 is a plot of adjacent track interference metrics calculated during a threshold calibration process taking measurements with increasing track squeeze until data decoding fails in accordance with some embodiments of the present invention.
Figure 7:
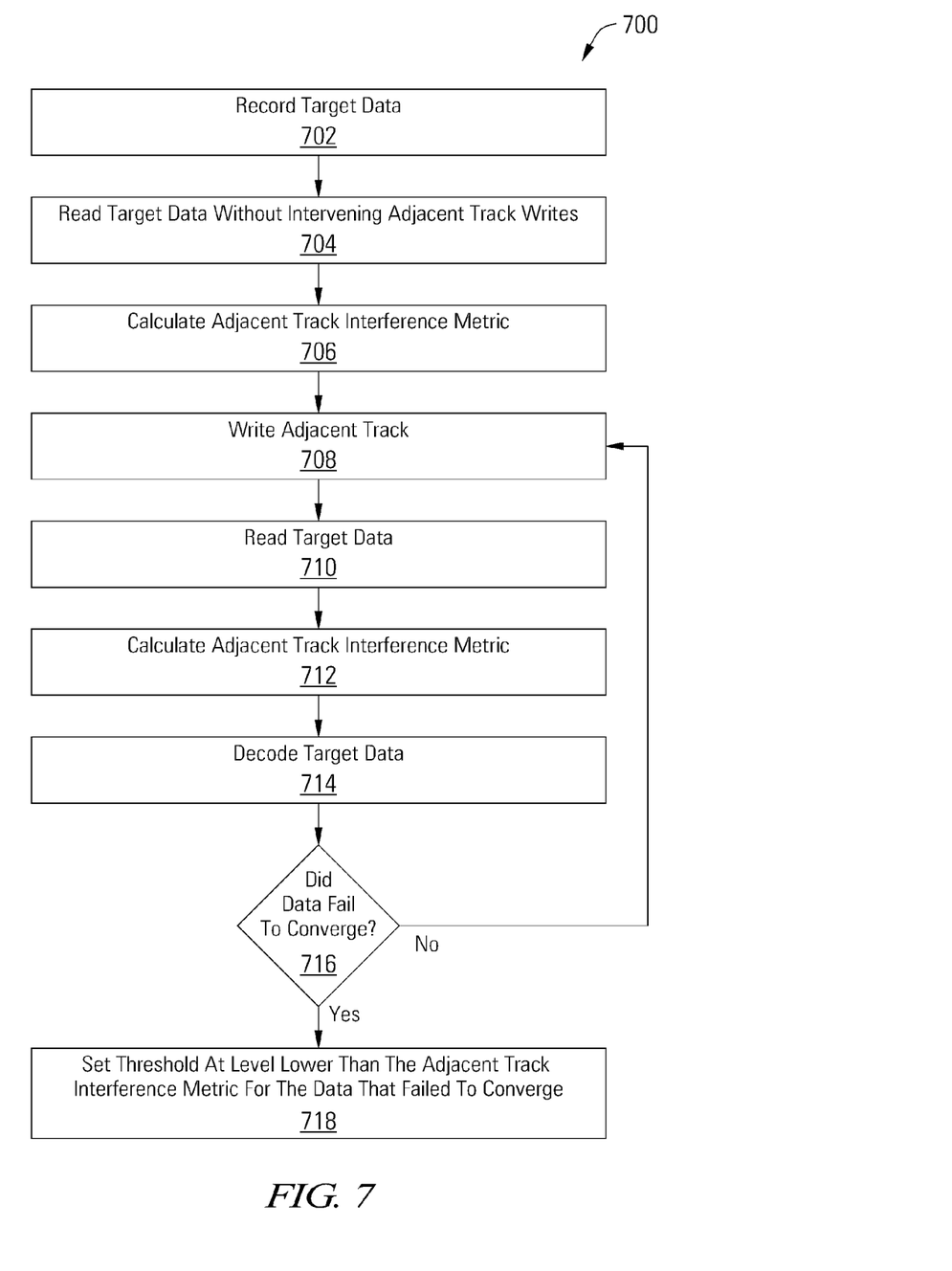
FIG. 7 is a flow diagram showing a method for calibrating the threshold for the adjacent track interference metric including reading data with increasing adjacent track interference based on track squeeze until data decoding fails in accordance with some embodiments of the present invention.

Turning now to FIGS. 6 and 7, the threshold calibration is disclosed in more detail in accordance with some embodiments of the present invention. In some embodiments shown in FIGS. 6 and 7, the threshold value is calibrated based on multiple reads of a target sector with side track write operations between reads of the target sector. The adjacent track interference metric is calculated after each read, and the side track write and target sector read process is continued until the read data fails to converge in the decoder. The threshold is then set at a value that is somewhat less than the value of the adjacent track interference metric when the decoder fails. In some embodiments, the process is accelerated by increasing the squeeze, writing the side track closer to the target sector to increase the adjacent track interference to reduce the number of side track write/target sector read iterations needed to reach decoder failure. In some embodiments, the process is accelerated by off-center reads of the target sector to simulate an increase in the adjacent track interference to reduce the number of side track write/target sector read iterations needed to reach decoder failure.

A plot 600 of the adjacent track interference metrics calculated during this threshold calibration process is shown in FIG. 6 in accordance with some embodiments of the present invention. The Y axis corresponds to the adjacent track interference metric 602, and the X axis corresponds to the number of side track writes 604 and accompanying target sector reads performed, until a read/write operation results in decoder failure. Three different calibration processes 606, 608, 610 are plotted in FIG. 6, with a first 606 of the calibration processes performed without increasing the side track squeeze or reading the target sector off-center. The second 608 and third 610 calibration processes plotted in FIG. 6 are performed with increasing levels of side track squeeze and/or off-center target sector reads, respectively, showing the more rapid increase in the adjacent track interference metric 602 for a given number of side writes 604 when side track squeeze is applied or the target sector is read with an offset from the center of the track. Thus, the calibration process can be performed more quickly using side track squeeze and/or off-center reads. Notably, some error level 616 may be detected even when no adjacent track interference exists, and no side track writes have been performed, due to channel noise.

The calibration write/read process is performed repeatedly until the decoder can no longer correctly recover the data in the target sector, and the value 612 of the adjacent track interference metric 602 when the decoder fails is noted. The threshold is then set at a level somewhat lower than the value 612 that causes decoder failure, that being the level of adjacent track interference at which the target sector can no longer successfully be refreshed. For example, in some embodiments the threshold is set to the value 614 of the adjacent track interference metric for the read operation just prior to the side track write that results in decoder failure. In some embodiments, the threshold is set to a smaller percentage of the value 612 of the adjacent track interference metric 602 that causes decoder failure, providing a larger safety margin for the data at the expense of more frequent refreshes.

Turning to FIG. 7, a flow diagram 700 shows a method for calibrating the threshold for the adjacent track interference metric including reading data with increasing adjacent track interference based on track squeeze and/or off-center reads in accordance with some embodiments of the present invention. Following flow diagram 700, the target data sector is recorded (block 702), and is then read back without intervening adjacent track writes (block 704). The adjacent track interference metric is calculated (block 706), establishing the nominal value for the adjacent track interference metric when there is no adjacent track interference. Again, the nominal adjacent track interference metric may have a non-zero value due to channel noise even before an adjacent track is written. The nominal adjacent track interference metric can be used in some embodiments in setting the threshold value. In other embodiments, the nominal adjacent track interference metric is not used, and the operations of blocks 704 and 706 can be omitted.

The amount of data read and used to calculate the adjacent track interference metric is not limited to any particular value. In some embodiments, a sector of data on a magnetic hard drive is used. In other embodiments, multiple sectors are used, such as, but not limited to, ten sectors.

An adjacent track is written (block 708), the target sector is read (block 710), and the adjacent track interference metric is calculated (block 712). As part of reading the target sector, the data is processed, such as, but not limited to, in a detection/decoding process (block 714) as in FIGS. 3-4. A determination is made as to whether the data failed to converge (block 716), or in other words, whether the true values of the data could be determined and any errors identified and corrected. If the data converged, the process continues at block 708 by writing the adjacent track again. If the data failed to converge, then the last calculated adjacent track interference metric indicates a level at which the data can no longer be retrieved and refreshed. The threshold is set at a level lower than the adjacent track interference metric for the data that failed to converge (block 718). In some embodiments, this is accomplished by setting the threshold equal to the previously calculated adjacent track interference metric just before the side track write that caused decoding of the target sector to fail. In some other embodiments, this is accomplished by setting the threshold at a particular percentage of the distance between the nominal value for the adjacent track interference metric and the failing adjacent track interference metric.

In some embodiments, the calibration process is accelerated by increasing the side track squeeze, writing the side track more closely to the track containing the target sector to increase the adjacent track interference of each write. In some embodiments, the calibration process is accelerated by reading the target sector off-center to effectively increase the adjacent track interference.

In some embodiments, the side track is written multiple times between each target sector read. In these embodiments, the value of the threshold can be obtained by extrapolating between calculated adjacent track interference metrics. In some embodiments, the process ends before the decoder actually fails, and extrapolation is performed based on calculated adjacent track interference metrics to extend a line correlating the number of side writes with the degree of adjacent track interference. In these embodiments, the threshold is set based on the knowledge that a given number of errors is likely to result in decoder failure.

Figure 8:
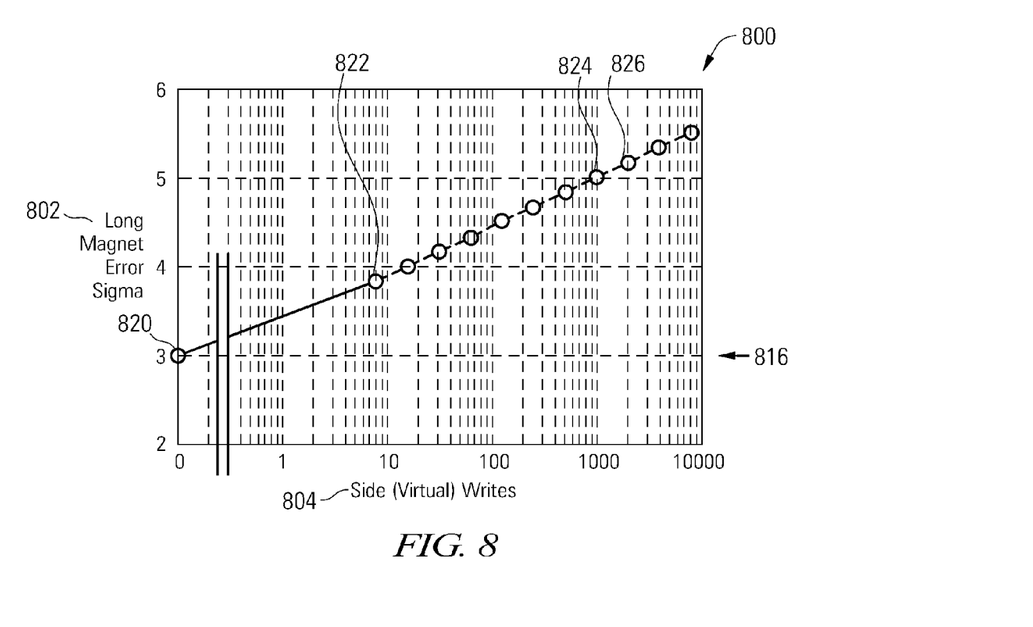
FIG. 8 is a plot of adjacent track interference metrics calculated during a threshold calibration process taking measurements with increasing noise scaling until data decoding fails in accordance with some embodiments of the present invention.
Figure 9:
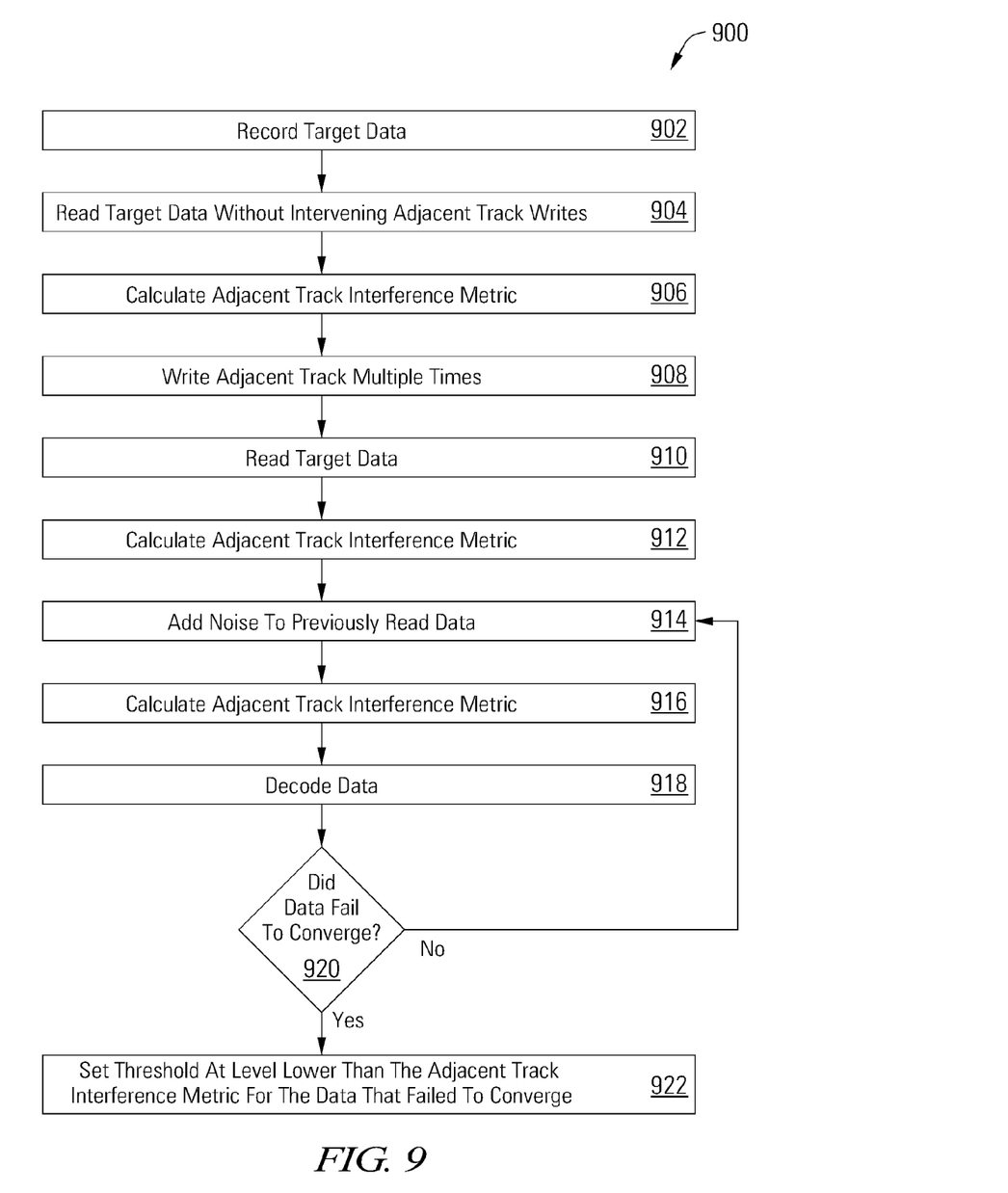
FIG. 9 is a flow diagram showing a method for calibrating the threshold for the adjacent track interference metric including reading data with increasing adjacent track interference based on noise scaling until data decoding fails in accordance with some embodiments of the present invention.

Turning now to FIGS. 8 and 9, the threshold calibration is disclosed in more detail in accordance with some embodiments of the present invention. In some embodiments shown in FIGS. 8 and 9, the threshold value is calibrated based on a few reads of a target sector with side track write operations between the reads of the target sector, followed by noise scaling to simulate increasing levels of adjacent track interference and repeated decoding of the increasingly noise scaled data until the data fails to converge in the decoder. The threshold is then set at a value that is somewhat less than the value of the adjacent track interference metric when the decoder fails.

A plot 800 of the adjacent track interference metrics calculated during this threshold calibration process is shown in FIG. 8 in accordance with some embodiments of the present invention. The Y axis corresponds to the adjacent track interference metric 802, and the X axis corresponds to the number of side track writes 804 (some of them virtual using scaled noise) and accompanying decoding operations, until the decoding fails. Notably, some error level 816 may be detected even when no adjacent track interference exists, and no side track writes have been performed, due to channel noise.

The target track is recorded, read back, and the nominal value 820 of the adjacent track interference metric is calculated. A number of side track writes are performed, such as, but not limited to, 10 or 100 side track writes. The target track is read back, and another value 822 of the adjacent track interference metric is calculated. The last read data is manipulated by introducing errors into the data, referred to herein as noise scaling, the adjacent track interference metric for the manipulated data is calculated, and the manipulated data is again decoded to determine whether decoding fails. This increasing noise scaling simulates additional side writes, without having to actually perform the side writes. The process continues until the decoder fails, and the threshold is set at a value 824 for the adjacent track interference metric somewhat below the value 826 at which the decoding failed.

In some embodiments, the process is accelerated by using large noise scaling steps initially, then using smaller noise scaling steps when the decoder is closer to failing to speed up the initial process without sacrificing precision in the value of the calibrated threshold.

Turning to FIG. 9, a flow diagram 900 shows a method for calibrating the threshold for the adjacent track interference metric including reading data with increasing adjacent track interference based on track squeeze and/or off-center reads in accordance with some embodiments of the present invention. Following flow diagram 900, the target data is recorded (block 902), and is then read back without intervening adjacent track writes (block 904). The adjacent track interference metric is calculated (block 906), establishing the nominal value for the adjacent track interference metric when there is no adjacent track interference. Again, the nominal adjacent track interference metric may have a non-zero value due to channel noise even before an adjacent track is written. The amount of data read and used to calculate the adjacent track interference metric is not limited to any particular value. In some embodiments, a sector of data on a magnetic hard drive is used. In other embodiments, multiple sectors are used, such as, but not limited to, ten sectors.

An adjacent track is written multiple times (block 908), for example, but not limited to, 10 or 100 times, the target data is again read (block 910), and the adjacent track interference metric is calculated (block 912). Noise scaling is performed, adding noise to the previously read data (block 914). The adjacent track interference metric is calculated (block 916), and the data with added noise is decoded (block 918). A determination is made as to whether the data failed to converge (block 920). If the data converged, the process continues at block 914 by adding more noise to the data, calculating the adjacent track interference metric and decoding again. If the data failed to converge, then the last calculated adjacent track interference metric indicates a level at which the data can no longer be retrieved and refreshed. The threshold is set at a level lower than the adjacent track interference metric for the data that failed to converge (block 922). In some embodiments, this is accomplished by setting the threshold equal to the previously calculated adjacent track interference metric just before the noise scaling that caused decoding to fail. In some other embodiments, this is accomplished by setting the threshold at a particular percentage of the distance between the nominal value for the adjacent track interference metric and the failing adjacent track interference metric.

Figure 10:
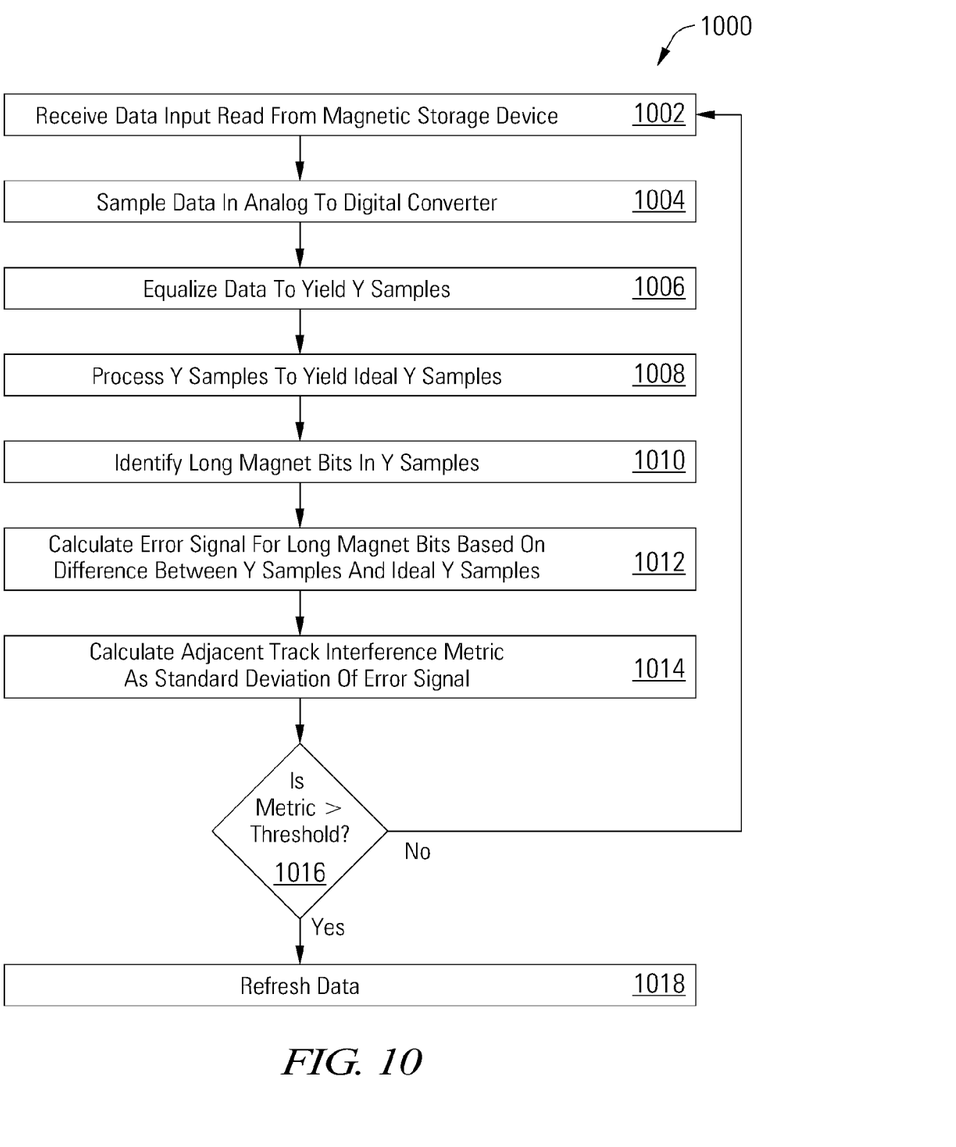
FIG. 10 is a flow diagram showing a method for determining when to refresh a data sector based on an adjacent track interference metric in accordance with some embodiments of the present invention.

Turning to FIG. 10, a flow diagram 1000 shows a method for determining when to refresh data (e.g., a data sector) based on an adjacent track interference metric in accordance with some embodiments of the present invention. Following flow diagram 1000, a data input is received, read from a magnetic storage device (block 1002). The data is sampled in an analog to digital converter (block 1004), and equalized to yield Y samples (block 1006). The Y samples are processed to yield ideal Y samples (block 1008). The ideal Y samples may be based, for example, on detected values from a Viterbi detector or decoded values from a low density parity check decoder, and may further be based on convolution with a partial response target in some embodiments. Long magnet bits are identified in the Y samples (block 1010), or equivalently, in the ideal Y samples. An error signal is calculated for the long magnet bits based on the difference between the Y samples and the ideal Y samples (block 1012). The adjacent track interference metric is calculated (block 1014), in some embodiments as the standard deviation of the error signal. A determination is made as to whether the adjacent track interference metric is greater than a threshold (block 1016). If so, a refresh of the data is requested (block 1018).

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for calculating an adjacent track interference metric to preventing adjacent track erasure. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit comprising:
    a long magnet identification circuit operable to identify long magnet bits in data to be processed, the long magnet bits comprising bits having a same value as a number of preceding and subsequent bits;
    an error calculation circuit operable to subtract an ideal version of the long magnet bits from the long magnet bits to yield an error signal;
    an adjacent track interference metric calculation circuit operable to calculate an adjacent track interference metric based on the error signal; and
    a comparator circuit operable to compare the adjacent track interference metric with a threshold value and to assert a refresh signal when the adjacent track interference metric is greater than the threshold value.

2. The data processing circuit of claim 1, wherein the track refresh signal is operable to trigger a magnetic storage device to refresh data on a data track.

3. The data processing circuit of claim 1, wherein the adjacent track interference metric calculation circuit is operable to calculate a standard deviation of the error signal.

4. The data processing circuit of claim 1, wherein the long magnet identification circuit is operable to compare a bit with two preceding and two subsequent bits, wherein the long magnet bits have the same value as the two preceding and the two subsequent bits.

5. The data processing circuit of claim 1, wherein the adjacent track interference metric calculation circuit is operable to calculate the adjacent track interference metric as a square root of a mean of the error signal squared, minus a squared mean of the error signal.

6. The data processing circuit of claim 1, further comprising an analog to digital converter operable to sample an analog input signal, and an equalizer circuit operable to equalize an output of the analog to digital convert to yield the data to be processed.

7. The data processing circuit of claim 1, further comprising a data detector operable to yield detected values of the data to be processed, wherein the ideal version of the long magnet bits comprises long magnet bits in the detected values.

8. The data processing circuit of claim 1, further comprising a data detector operable to yield detected values of the data to be processed, and a convolution filter operable to convolve the detected values with a partial response target to yield an ideal version of the data to be processed, wherein the long magnet bits comprise long magnet bits in the ideal version of the data to be processed.

9. The data processing circuit of claim 1, further comprising a data detector operable to yield detected values of the data to be processed, and a data decoder operable to yield decoded values of the detected values, wherein the ideal version of the long magnet bits comprises long magnet bits in the decoded values.

10. The data processing circuit of claim 1, further comprising a data detector operable to yield detected values of the data to be processed, and a data decoder operable to yield decoded values of the detected values, and a convolution filter operable to convolve the decoded values with a partial response target to yield an ideal version of the data to be processed, wherein the long magnet bits comprise long magnet bits in the ideal version of the data to be processed.

11. The data processing circuit of claim 1, further comprising a threshold calibration circuit operable to calibrate the threshold value at a level at which the long magnet bits have undergone adjacent track interference but at which the data to be processed can still be refreshed.

12. The data processing circuit of claim 1, further comprising a threshold calibration circuit operable to repeatedly read a data block from a storage medium and to write an adjacent track until the data block cannot be correctly recovered, and to set the threshold level at a level below an adjacent track interference metric value when the data block cannot be correctly recovered.

13. The data processing circuit of claim 1, further comprising a threshold calibration circuit operable to write and read a data block from a storage medium and to perform noise scaling of the data block while repeatedly calculating the adjacent track interference metric and processing the data block until values of the data block cannot be correctly recovered, and to set the threshold level at a level below a last calculated adjacent track interference metric.

14. The data processing circuit of claim 1, wherein the circuit is implemented as an integrated circuit.

15. The data processing circuit of claim 1, wherein the circuit is incorporated in a storage device.

16. A method for preventing adjacent track erasure, comprising:
    reading data from a storage medium;
    identifying long magnet bits in the data read from the storage medium;
    calculating an adjacent track interference metric based on the long magnet bits;
    comparing the adjacent track interference metric with a threshold; and
    refreshing the data when the adjacent track interference metric exceeds the threshold.

17. The method of claim 16, further comprising calibrating the threshold at a level at which the long magnet bits have undergone adjacent track interference but at which correct values for the data can still be determined.

18. The method of claim 16, further comprising calibrating the threshold by:
    recording target data on the storage medium;
    repeatedly writing an adjacent track on the storage medium, reading the target data and calculating the adjacent track interference metric until correct values for the target data can no longer be determined; and
    setting the threshold at a value of the adjacent track interference metric prior to when the correct values could no longer be determined.

19. The method of claim 16, further comprising calibrating the threshold by:
  writing and reading target sector on the storage medium;
  repeatedly increasing noise in data read from the target sector and calculating the adjacent track interference metric until correct values for the target sector can no longer be determined; and
  setting the threshold at a value of the adjacent track interference metric prior to when the correct values could no longer be determined.

20. A storage device, comprising:
  a storage medium;
  a head assembly disposed in relation to the storage medium and operable to read and write data on the storage medium; and
  a read channel circuit operable to identify long magnet bits in the data read from the storage medium, to calculate an adjacent track interference metric based on the long magnet bits, to compare the adjacent track interference metric with a threshold, and to refresh the data on the storage medium when the adjacent track interference metric exceeds the threshold.

\* \* \* \* \*